United States Patent
Li et al.

(10) Patent No.: US 7,679,750 B2
(45) Date of Patent: Mar. 16, 2010

(54) CAVITY RING-DOWN APPARATUS AND METHOD FOR MEASURING REFLECTIVITY OF HIGHLY REFLECTIVE MIRRORS

(75) Inventors: Bincheng Li, Sichuan (CN); Yuan Gong, Sichuan (CN)

(73) Assignee: Institute of Optics and Electronics, Chinese Academy of Sciences, Sichuan (CN)

( * ) Notice: Subject to any disclaimer, the term of this patent is extended or adjusted under 35 U.S.C. 154(b) by 87 days.

(21) Appl. No.: 12/175,903

(22) Filed: Jul. 18, 2008

(65) Prior Publication Data

US 2009/0244541 A1    Oct. 1, 2009

(30) Foreign Application Priority Data

Mar. 26, 2008    (CN) .................... 2008 1 0102778

(51) Int. Cl.
    *G01N 21/55*    (2006.01)
(52) U.S. Cl. .................................... 356/445
(58) Field of Classification Search ......... 356/445–448, 356/432–440; 250/343
    See application file for complete search history.

(56) References Cited

U.S. PATENT DOCUMENTS

| | | |
|---|---|---|
| 4,571,085 A | 2/1986 | Anderson |
| 4,793,709 A | 12/1988 | Jabr et al. |
| 5,313,270 A | 5/1994 | Fishman et al. |
| 5,528,040 A * | 6/1996 | Lehmann ................. 250/343 |
| 5,903,358 A * | 5/1999 | Zare et al. ................. 356/437 |
| 6,466,322 B1 | 10/2002 | Paldus et al. |
| 6,532,071 B2 * | 3/2003 | Zare et al. ................. 356/437 |
| 6,839,140 B1 | 1/2005 | O'Keefe et al. |
| 6,865,198 B2 * | 3/2005 | Taubman ................. 372/29.023 |
| 7,586,114 B2 * | 9/2009 | Cole et al. ................. 250/575 |

OTHER PUBLICATIONS

G. Rempe, R.J. Thompson, and H.J. Kimble—Measurement of Ultralow Losses in an Optical Interferometer; Mar. 1, 1992, vol. 17, No. 5, Optics Letters—pp. 363-365.

I. Debecker and A.K. Mohamed—High-Speed Cavity Ringdown Spectroscopy With Increased Spectral Resolution by Silmultaneous Laser and Cavity Tunning; Apr. 18, 2005, vol. 13, No. 8, Optics Express—pp. 2906-2915.

(Continued)

*Primary Examiner*—Hoa Q Pham
(74) *Attorney, Agent, or Firm*—F. Chau & Associates, LLC (57) ABSTRACT

A cavity ring-down apparatus and method is provided for measuring the reflectivity of highly reflective mirrors. The apparatus comprises an optical ring-down cavity including three highly-reflective mirrors whose frequency-selective optical transmission is retro-reflected into the oscillator cavity of a continuous-wave semiconductor laser, creating a change of output spectrum of said laser and enhancing the coupling coefficient of the laser power into the optical ring-down cavity. The drive current/voltage of the semiconductor laser is modulated by a square-wave function output by a function generation card. Thus the laser beam is suddenly switched off at the negative step of the square-wave signal periodically. Immediately after switching off the laser beam, an exponential decay signal of the ring-down cavity is measured by a photo detector and used to determine the decay time of the cavity and the reflectivity of highly reflective mirrors.

25 Claims, 5 Drawing Sheets

OTHER PUBLICATIONS

R.W. Tkach and A.R. Chraplyvy—Regimes of Feedback Effects in 1.5-µm Distributed Feedback Lasers; Nov. 1986; vol. LT-4, No. 11, Journal of Highwave Technology—pp. 1655-1661.

J. Morvile, S. Kassi, M. Chenevier, D. Romanini; Fast, Low-Noise, Mode-By-Mode, Cavity-Enhanced Absorption Spectroscopy by Diode-Laser Self-Locking; Applied Physics 2005—pp. 1027-1038.

* cited by examiner

CAVITY RING-DOWN APPARATUS AND METHOD FOR MEASURING REFLECTIVITY OF HIGHLY REFLECTIVE MIRRORS

CROSS-REFERENCE TO RELATED APPLICATION

This application claims priority, under 35 USC §119, of Chinese Patent Application No. 200810102778.8 filed on Mar. 26, 2008, the entire contents of which are herein incorporated by reference.

FIELD OF THE INVENTION

The invention relates generally to the measurement of the parameters of optical components and, in particular, to the measurement of reflectivity of highly reflective mirrors using a cavity ring-down apparatus and method.

BACKGROUND OF THE INVENTION

The film-deposition technology has been developing rapidly in recent years and the performance of thin films, especially the widely used highly reflective (HR) coatings, has been greatly improved. However, it is difficult to determine high reflectivity (R>99.9%) of HR coatings using conventional instruments and methods such as a spectrophotometer. To measure the reflectivity approaching unity, the so-called cavity ring-down (CRD) technique has been employed. It is based on the measurement of the decay time of laser power in an optical ring-down cavity, which comprises two highly reflective mirrors. The decay time is inversely proportional to the total losses of the optical ring-down cavity and directly proportional to the length of the cavity. Due to the natural characteristics of time measurement, CRD technique has the advantage of being insensitive to the power fluctuation of the light source, results in an improved accuracy in determining low losses or high reflectivities. Nowadays numerous articles and patents can be found in literature, providing various CRD arrangements and methods, especially in the fields of absorption spectroscopy and trace analyses. For detailed information, see for examples the articles by O'Keefe and Deacon in Rev. Sci. Instrum. 59(12): 2544-2551 (1988), Engeln et al. in Chem. Phys. Lett. 262: 105-109 (1996), Romanini et al. in Chem. Phys. Lett. 264: 316-322 (1997) and U.S. Pat. Nos. 6,839,140 and 6,466,322.

Herbelin et al. have proposed the use of an optical cavity for measuring the reflectivity of mirrors. In this technique, a continuous-wave (cw) laser beam with modulated intensity is coupled into an optical cavity which comprises mirrors with unknown reflectivity. The total cavity losses are determined from the phase shift induced in the laser signal while it passes through the optical cavity. The reflectivity of a planar mirror is determined by the change of total cavity loss introduced by inserting the planar mirror into the optical cavity. However, the use of a narrow-bandwidth laser in their apparatus causes large noise in the cavity output signal and results in a limited measurement sensitivity and accuracy.

U.S. Pat. No. 4,793,709 describes a pulsed cavity ring-down method for measuring the losses of an optical cavity. In this method the following steps are involved: (1) generating one laser pulse having a bandwidth that exceeds the free spectral range of the optical cavity; (2) directing that pulse into an optical cavity; (3) measuring the temporal signal of the intensity of the laser beam exiting the cavity. The amount of time span for this intensity to decay from a first predetermined value to a second predetermined value is measured and then the loss of the optical cavity is determined. However, a pulsed laser with a high peak power, which is often costly and with various complicated optical components, is needed to obtain sufficiently high output intensity from the ring-down cavity.

U.S. Pat. No. 4,571,085 presents a cavity ring-down method for measuring the decay time of an optical cavity by directing a cw laser beam into the cavity, switching the beam off when the amplitude of the cavity output signal reaches a predetermined threshold level, then monitoring the temporal decay of the laser beam intensity exiting the optical cavity immediately after switching off the beam, and measuring the intensity decay time with an oscilloscope. In this technique, a narrow-bandwidth laser is used as the light source. The spectrum of the laser drifts occasionally and randomly due to environmental temperature fluctuation, mechanical vibration, etc. The spectrum of the laser is occasionally in resonance with one or more eigen-modes of the ring-down cavity, results in rapid increases of the light intensities inside and exiting the ring-down cavity. One disadvantage of this technique is the low efficiency in the decay time measurement, due to the low probability of spectral resonance. In addition, in this technique, a fast optical switch, such as an acousto-optic modulator, is needed to switching the beam off the ring-down cavity.

Another method based on the decay time measurement for determining ultra-low loss of an optical cavity is disclosed by G. Rempe, R. J. Thompson, H. J. Kimble in "Measurement of ultra-low losses in an optical interferometer", Opt. Lett., Vol. 17, No. 5, pp. 363 (Mar. 1, 1992). A cw laser is employed as the light source. A piezo-electric transducer (PZT) is employed to slowly scan the length of the optical cavity, making the laser frequency periodically in resonant with frequencies of the cavity eigen-modes. The cw laser beam is switched off by an acousto-optic switch (AOS) when the amplitude of the cavity output signal exceeds a predefined threshold and the subsequent temporal decay of the cavity output immediately after switching off the beam is recorded to determine the decay time and the cavity loss. This technique greatly improves the efficiency of the decay time measurement. However, it is costly and complicated because of the use of PZT and AOS.

Another cavity ring-down technique is developed for absorption spectroscopy by K. J. Schulz, W. R. Simpson in "Frequency-matched cavity ring-down spectroscopy", Chem. Phys. Lett., Vol. 297, pp. 523, 1998. In this technique, the coupling of narrow-bandwidth laser power into a fixed-length cavity is obtained through laser frequency modulation. An external cavity diode laser (ECDL) provides a tunable laser beam, whose frequency is modulated back and forth across one of the longitudinal modes of the ring-down cavity. When the amplitude of the ring-down cavity output signal exceeds a pre-set threshold value, the incident laser beam is switched off and a ring-down signal is recorded to determine the total losses of the ring-down cavity. An acousto-optic modulator (AOM) is used to switch off the incident laser beam. The use of ECDL and AOM increases the complication of the apparatus.

A more complicated cavity ring-down technique is provided by I. Debecker, A. K. Mohamed, D. Romanini in "High-speed cavity ringdown spectroscopy with increased spectral resolution by simultaneous laser and cavity tuning", Opt. Express, Vol. 13, No. 8, pp. 2906, 2005. They employ a fast tuning of the laser frequency, along with a rapidly swept ring-down cavity, to obtain cavity output signals with a high signal-to-noise ratio and also to improve the speed of absorption spectrum measurement. An optical isolator is also used for eliminating the effect of optical feedback from the ringdown cavity into the ECDL. Although a fast optical switch is not needed, their experimental apparatus, including a tunable ECDL and a PZT, is rather complicated.

SUMMARY OF THE INVENTION

The present invention overcomes the shortcomings of prior arts by providing a novel cavity ring-down apparatus and method utilizing the optical feedback effect of semiconductor lasers for the accurate measurement of reflectivity of highly reflective mirrors. The apparatus includes a stable ring-down cavity which comprises two plano-concave mirrors and a planar mirror. All three mirrors are highly reflective. A function generation card provides a square-wave signal to modulate the drive current/voltage of a continuous-wave (cw) semiconductor laser. The laser beam is coupled into the ring-down cavity by being obliquely incident on the planar mirror and transmitted into the ring-down cavity along the optical axis of the ring-down cavity. A photo detector and a focusing lens are used to collect and transform the laser power exiting the ring-down cavity into an electric signal. A data acquisition card acquires and records the electric signal. A personal computer is used to control the function generation card and the data acquisition card, and also to process the electric signal to determine the cavity decay time and the reflectivity of highly reflective mirrors.

In the present invention, a frequency-selective optical feedback from the ring-down cavity is retro-reflected into the oscillator cavity of the semiconductor laser, causing a change in the laser spectrum and an enhancement of the coupling coefficient between the laser power and the ring-down cavity modes.

The method includes steps of, (1) providing a stable, initial optical ring-down cavity; (2) delivering a square-wave modulated cw laser beam emitted from a semiconductor laser into the initial optical ring-down cavity; (3) detecting the temporal signal of the intensity of the laser beam exiting the initial cavity immediately after switching off the output beam of said semiconductor laser at the negative step of the square-wave modulation signal; (4) determining the initial-cavity decay time; (5) inserting a test planar mirror into said initial-cavity to construct a testing cavity; (6) detecting again the temporal signal of the intensity of the laser beam exiting the cavity and determining the testing-cavity decay time; (7) calculating the high reflectivity of the test planar mirror.

The features will become apparent from the detailed description of the invention that follows. This description is accompanied by a set of drawing figures. It is to be understood that both the foregoing general description and the following detailed description are exemplary, but are not restrictive, of the invention.

DETAILED DESCRIPTION OF THE INVENTION

Figure 1:
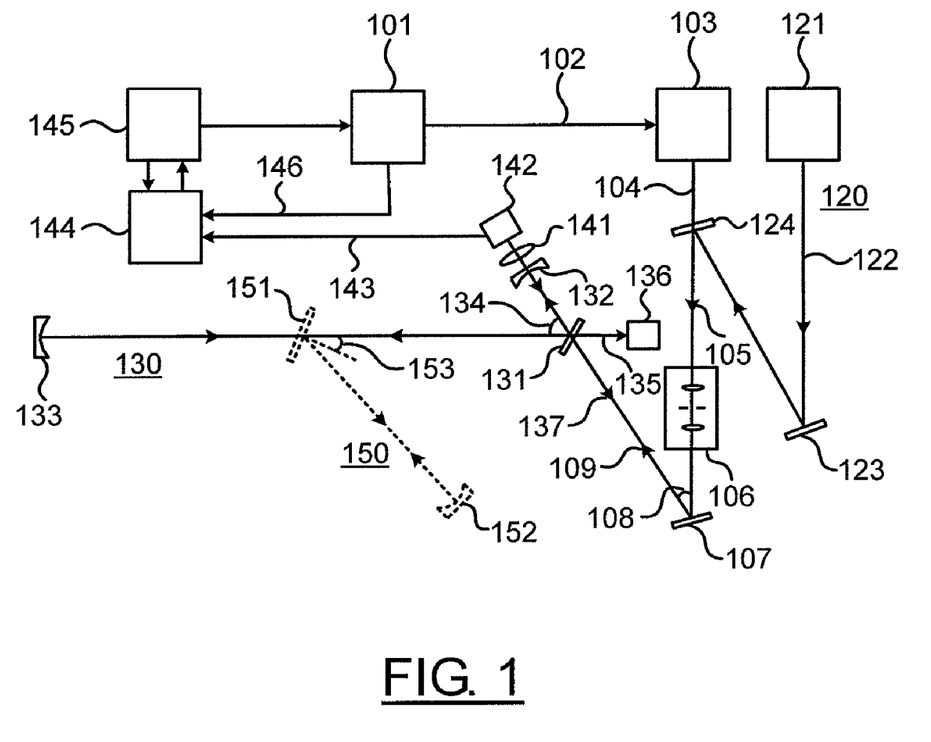
FIG. 1 is a schematic view of an exemplary apparatus of the present invention.

FIG. 1 illustrates an exemplary embodiment of the present invention. As shown in FIG. 1, a square-wave electric signal 102 is generated from a function generation card 101 and used to modulate the drive voltage of a broad-band (with spectral width above 0.001 nm but less than 10 nm), continuous-wave semiconductor laser 103. A laser beam 104, whose intensity is thus square-wave modulated, is emitted from the semiconductor laser 103. In case the laser beam 104 is visually invisible, a visible beam module 120 is employed for convenience of alignment of the optical arrangement. In this module, a visible light beam 122, generated from a visible light source 121, is adjusted by a reflective mirror 123 and a dichromatic beam splitter 124 to be coaxial with the laser beam 104, making it convenient to precisely adjust the optical components in the optical path of laser beam 104. The combined beam 105 is transmitted through a spatial filter 106, comprising two lenses and a small pinhole, for filtering the higher-order transverse modes of laser 103 and adjusting the position of the beam waist of the laser beam 104. The spatial filter 106 is not of necessity as long as the divergent angle of the laser beam 104 is small so that the laser beam can be totally coupled into the ring-down cavity 130 without significant diffraction loss. The combined beam 105 is deflected by a reflective mirror 107 in order to optimize the volume of the apparatus to make the apparatus more compact. The deflection angle 108 can be changed according to the actual condition.

The deflected laser beam 109 is obliquely incident on the highly reflective planar mirror 131 and coupled into the initial ring-down cavity 130, which comprises first plano-concave cavity mirror 132, second plano-concave cavity mirror 133 and the planar mirror 131. The concave surfaces of the cavity mirrors, 132 and 133, are coated with highly reflective thin films to improve their reflectivity and to decrease the total cavity losses. The initial ring-down cavity 130 is an optically-stable cavity, which is defined by $0<(1-L/\rho_1)(1-L/\rho_2)<1$, with L the cavity length along the optical axis of the cavity 130. $\rho 1$ and $\rho 2$ are the radii of curvature of the concave surfaces of the two cavity mirrors, 132 and 133, respectively. The planar mirror 131 and first cavity mirror 132 construct a short arm of the initial cavity 130, while the planar mirror 131 and second cavity mirror 133 construct a long arm. The angle 134 between two arms of the initial cavity 130 is between about 3° and 150°, at which the planar mirror 131 should be highly reflective. The laser beam 135 includes the direct reflection of the laser beam 109 from the surface of the planar mirror 131 and the frequency-selective transmission from the cavity 130. The frequency-selectively transmitted laser beam is perpendicular to the second concave cavity mirror 133. In order to avoid the scattering effect, the laser beam 135 is eliminated by an optical absorber 136.

Figure 2:
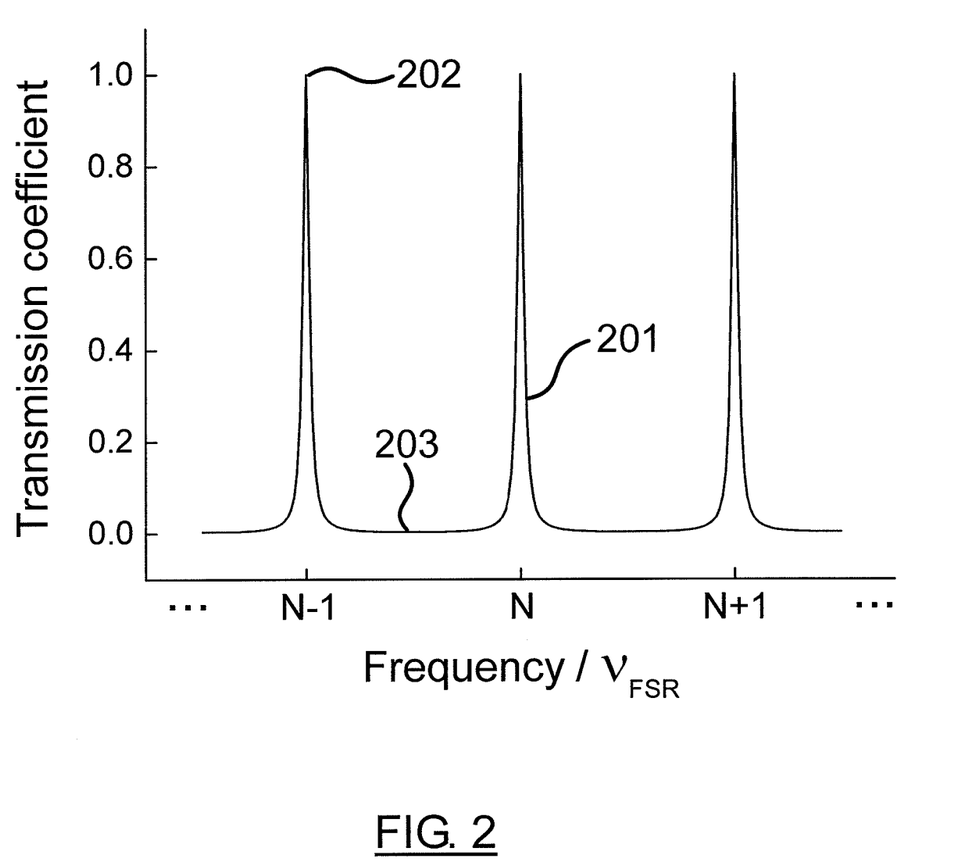
FIG. 2 illustrates schematically the frequency-selective transmission spectrum of an optical ring-down cavity, consisting of a pair of cavity mirrors with reflectivity of 99.9%.

The frequency-selectively transmitted laser beam 137 of the cavity 130, perpendicular to the first cavity mirror 132, is retro-reflected along the incident laser beam path 109 and 104 back into the oscillator cavity of the semiconductor laser 103. FIG. 2 shows the transmission spectrum of an optical ring-down cavity consisting of a pair of cavity mirrors with reflectivity of 99.9%. The transmission spectrum of an optical ring-down cavity is frequency-selective, with a sequence of transmission peaks 201 separated by a frequency shift of c/2L, with c the speed of light and L the cavity length. The laser power can be transmitted through the cavity with a transmission coefficient approaching unity at the resonant frequencies 202, and almost none of the laser power is transmitted in the spectral range 203 between the resonant frequencies. The re-injection of the frequency-selectively transmitted laser beam 137 into the oscillator cavity of the semiconductor laser 103 causes a spectral narrowing of laser output and a locking between the narrowed laser spectrum and one or more of the ring-down cavity modes. Thus the coupling coefficient of the laser power into the ring-down cavity is greatly enhanced. The laser beam exiting the ring-down cavity through the first cavity mirror 132 is focused into a photo detector 142 by a focusing lens 141. The photo detector 142 transforms the laser power into an electric signal 143, which is recorded by a data-acquisition card 144 and analyzed by a personal computer 145. Both data-acquisition card 144 and the function generation card 101 are controlled by the personal computer 145. One output channel of the function generation card 101 is used to modulate the semiconductor laser 103 while the other output channel 146 to trigger the data-acquisition card 144 to record the cavity ring-down signal. The output signals of the two channels are in phase but may be with different voltage values.

Figure 3A:
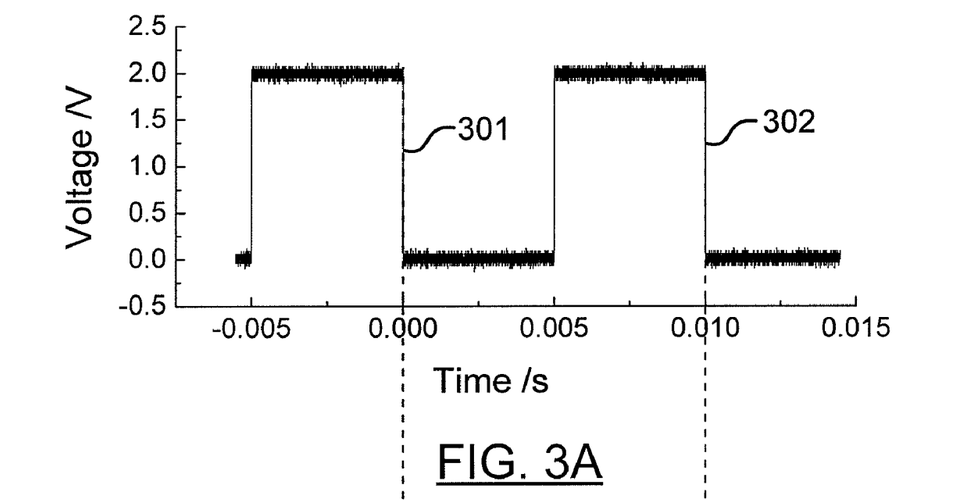
FIG. 3A illustrates an exemplary square-wave signal of the present invention for modulating the drive voltage of the semiconductor laser and as a reference signal for triggering the data-acquisition card to record the exponential-decay ring-down signal.
Figure 3B:
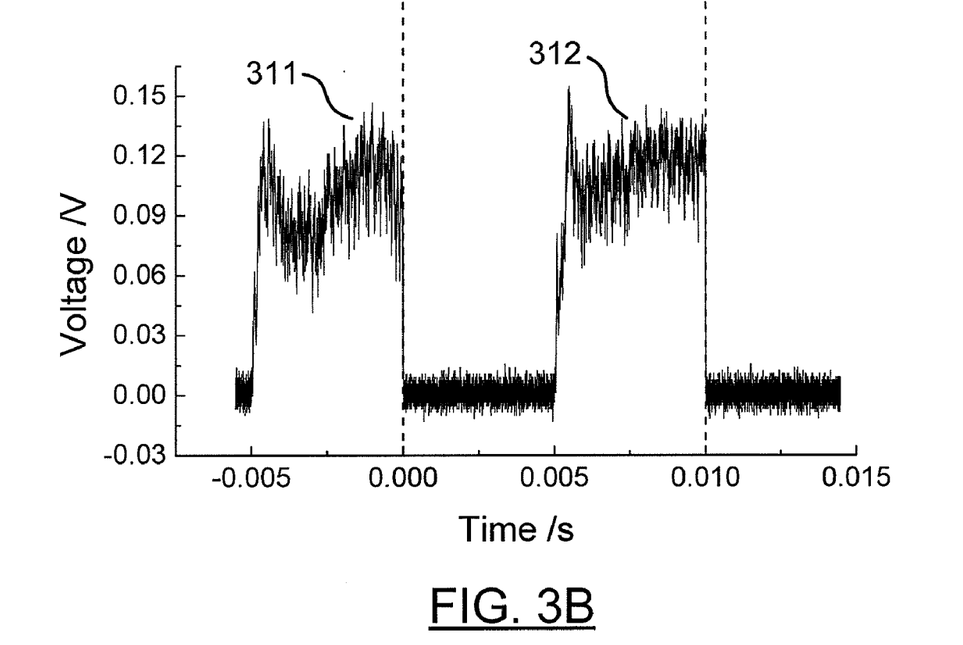
FIG. 3B illustrates an exemplary cavity output signal obtained based on the exemplary apparatus of the present invention.
Figure 4A:
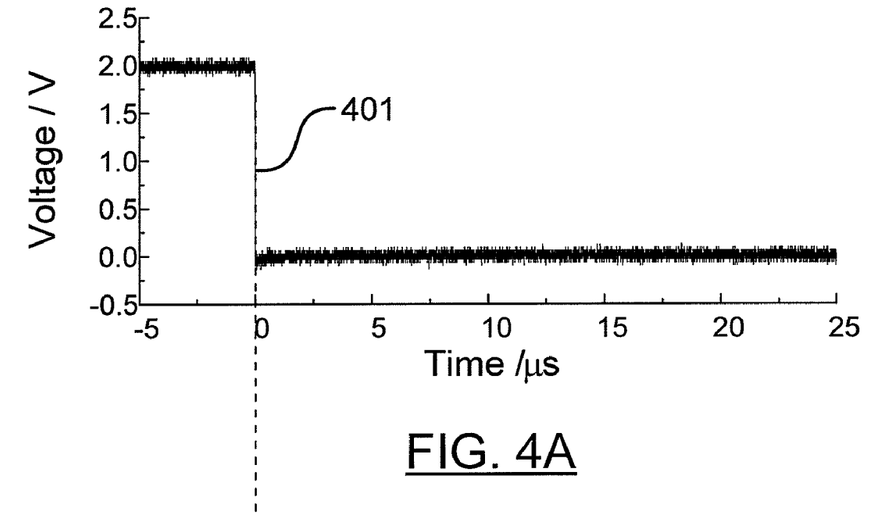
FIG. 4A depicts the negative step of an exemplary square-wave signal of the present invention.
Figure 4B:
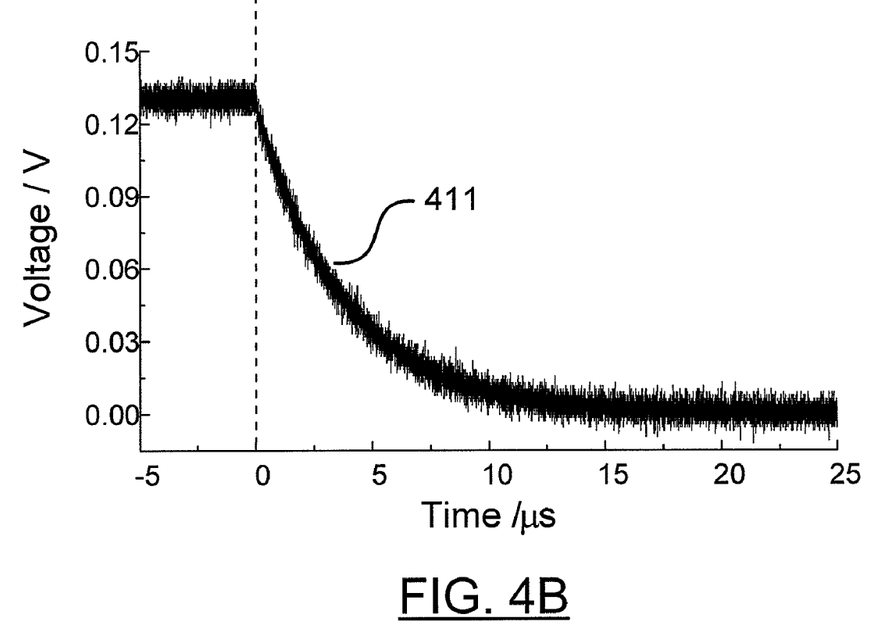
FIG. 4B depicts an exemplary exponential-decay ring-down signal immediately after switching off the semiconductor laser at the negative step of the square-wave signal according to the exemplary initial ring-down cavity of the present invention.

FIG. 3A illustrates an exemplary square-wave signal generated by the function generation card 101 for modulating the drive voltage of the semiconductor laser and as a reference signal for triggering the data acquisition card. The output of the semiconductor laser is switched off at the negative step 301 or 302 of each modulation period. FIG. 3B illustrates an exemplary cavity output signal generated by the photo detector 142 according to the exemplary apparatus of the present invention, as shown in FIG. 1. The amplitude of the cavity output signal frequently exceeds 100 mV, as shown by 311 and 312, even if a pair of cavity mirrors with reflectivity of higher than 99.99% and a planar mirror with reflectivity of about 99.95% are used. As an enlarged view of FIG. 3A and FIG. 3B in time scale, FIG. 4A and FIG. 4B illustrate the negative step of the reference signal 401 and the exponential decay 411 of the cavity output signal, respectively. The exponential decay signal 411, also named as cavity ring-down signal or cavity decay signal in literatures, is fitted to an exponential decay function, a exp($-t/\tau_1$)+b, with a the amplitude factor, b the dc offset of the signal amplitude and $\tau_1$ the initial-cavity decay time, respectively. The initial-cavity decay time $\tau_1$ is determined to be 3.764 μs with a cavity length of L=60 cm.

In order to determine its reflectivity, a test planar mirror 151 is inserted into the long arm of the initial ring-down cavity 130 to construct a four-mirror testing ring-down cavity 150, as shown in FIG. 1 by the dashed lines. The second cavity mirror 133 is moved to position 152, making the total cavity length equals the length of the initial ring-down cavity. The angle of incidence 153 of the laser beam onto the test planar mirror is adjusted according the required testing angle of incidence of the test mirror.

Figure 5A:
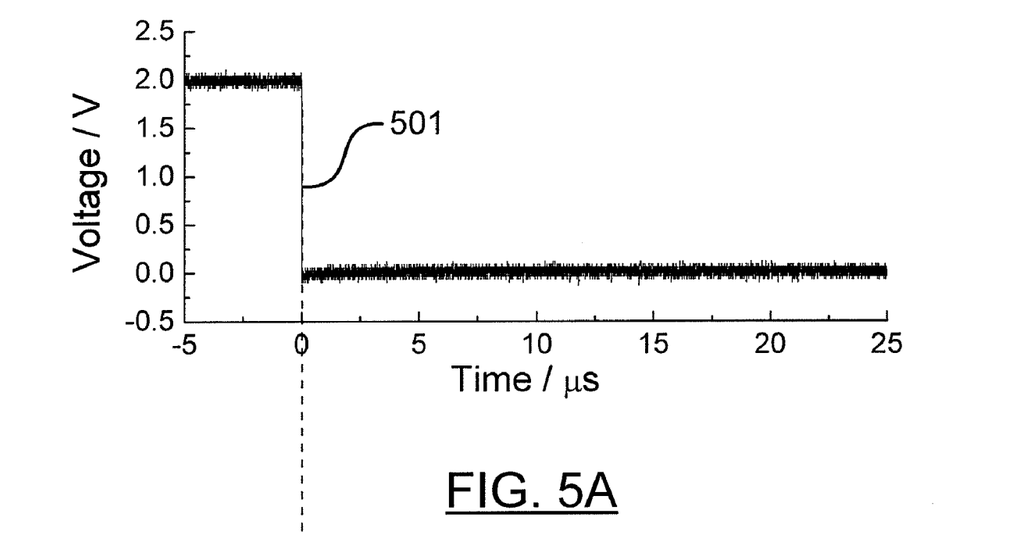
FIG. 5A is a graph depicting the negative step of another square-wave signal of the present invention.
Figure 5B:
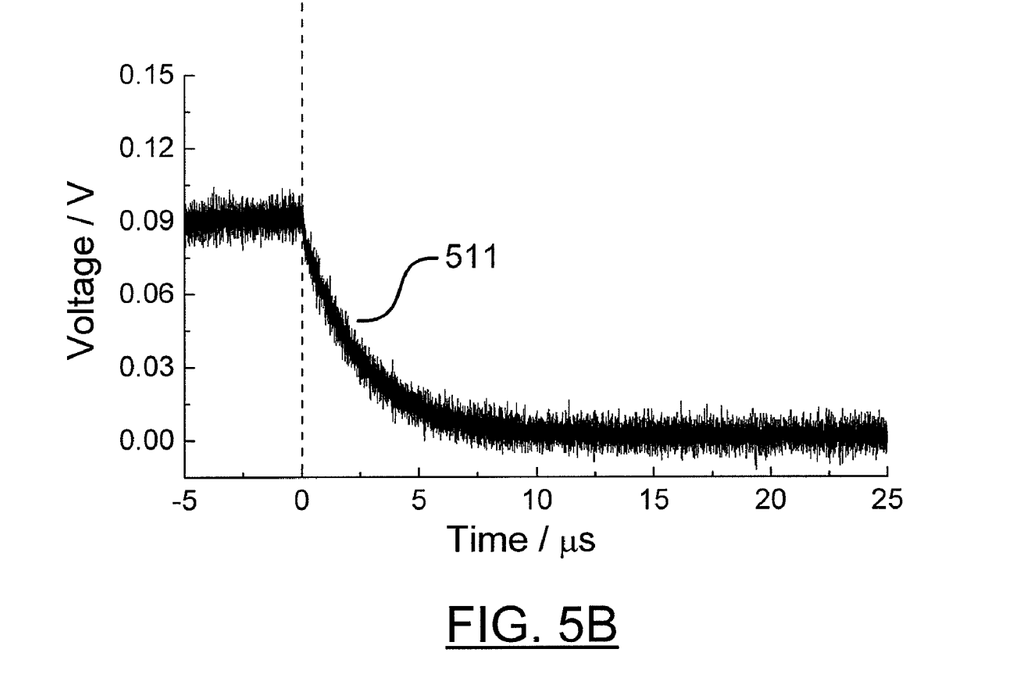
FIG. 5B is a graph depicting an exemplary exponential-decay ring-down signal immediately after switching off the semiconductor laser at the negative step of another square-wave signal according to the exemplary testing ring-down cavity of the present invention.

FIG. 5A and FIG. 5B illustrate the negative step of another square-wave signal 501 and corresponding exponential decay 511 of the output signal of the testing ring-down cavity, respectively. The exponential decay signal 511, is fitted to an exponential decay function, a exp($-t/\tau_2$)+b, with a the amplitude factor, b the dc offset of the signal amplitude and $\tau_2$ the testing-cavity decay time, respectively. The testing-cavity decay time $\tau_2$ is determined to be 2.481 μs with a cavity length of L=60 cm. Thus the high reflectivity of the test planar mirror $R_x$ is calculated by $R_x=\exp(L/c\tau_1-L/c\tau_2)$ to be 99.9725%. If the length of testing cavity 150 is not equal to that of the initial cavity 130, the reflectivity of the test planar mirror $R_x$ is calculated by $R_x=\exp(L_1/c\tau_1-L_2/c\tau_2)$, with $L_1$ and $L_2$ the lengths of the initial and testing ring-down cavities, respectively.

Various advantages are realized from the present invention, such as:

Cost savings as eliminating elements employed in the conventional cw-CRD schemes, such as the acoustic-optic modulator (AOM), the piezo-electric transducer (PZT) and optical isolator (OI).

Simplified CRD arrangement as it is not necessary to tune the laser wavelength or modulate the ring-down cavity length.

Low cost and easy control of the light source because of the use of a broad-spectrum semiconductor laser.

Although the invention is illustrated and described herein with reference to specific embodiments, the present invention is not limited to the details shown. Rather, various modifications may be made in the details within the scope and range of equivalents of the claims and without departing from the invention.

What is claimed is:

1. A cavity ring-down apparatus for measuring the reflectivity of highly reflective mirrors, the apparatus comprising:
  (a) A function generation card providing a square-wave signal;
  (b) A continuous-wave (cw) semiconductor laser whose drive current/voltage is modulated by said square-wave signal;
  (c) An optical ring-down cavity, consisting at least three highly reflective mirrors;
  (d) A focusing lens focusing the laser beam exiting said ring-down cavity into a small spot and a photo detector collecting the laser power at the focal point and transforming the laser power into an electric signal;
  (e) A data acquisition card acquiring and recording said electric signal from said photo detector;
  (f) A personal computer controlling said function generation card and data acquisition card and analyzing said electric signal to determine the reflectivity of highly reflective mirrors.

2. The apparatus of claim 1, further comprising two lenses and a pinhole between said semiconductor laser and said ring-down cavity.

3. The apparatus of claim 1, wherein said optical ring-down cavity is optically stable and comprises two plano-concave mirrors and a planar mirror.

4. The apparatus of claim 3, wherein concave surfaces of said two plano-concave mirrors and one surface of said planar mirror are coated with highly reflective, multilayer dielectric coatings at said semiconductor laser wavelength.

5. The apparatus of claim 4, wherein the planar surfaces of said plano-concave mirror and the other surface of said planar mirror are coated with anti-reflective coatings at said semiconductor laser wavelength.

6. The apparatus of claim 4, wherein three coated surfaces of two plano-concave mirrors and a planar mirror are the internal wall of said ring-down cavity.

7. The apparatus of claim 4, wherein all the reflectivity of the highly-reflectively coated surfaces of two plano-concave mirrors and a planar mirror are higher than 99%.

8. The apparatus of claim 3, wherein the substrates of said plano-concave mirrors and planar mirror are transparent to the output beam of said semiconductor laser.

9. The apparatus of claim 3, wherein said planar mirror and first plano-concave mirror construct a short arm and said planar mirror and second plano-concave mirror construct a long arm.

10. The apparatus of claim 9, wherein the angle between said short and long arms of said optical ring-down cavity is in the range of about 3° to 150°.

11. The apparatus of claim 1, wherein said photo detector and focusing lens are located behind the first plano-concave mirror along the short arm of the optical ring-down cavity.

12. The apparatus of claim 1, wherein said optical ring-down cavity further comprises two plano-concave mirrors, a planar mirror and a test planar mirror.

13. The apparatus of claim 12, wherein said planar mirror and first plano-concave mirror construct a short arm and said planar mirror and second plano-concave mirror construct a long arm, and said test planar mirror is inserted into the long arm of said optical ring-down cavity.

14. The apparatus of claim 13, wherein the incident angle of said test planar mirror is set to the intended angle of incidence (AOI) of said test planar mirror.

15. The apparatus of claim 1, wherein a card with both function generation and data acquisition modes is used for providing a square-wave signal to modulate the drive current/voltage of said semiconductor laser and acquiring said electric signal from said photo detector.

16. A cavity ring-down method for measuring the reflectivity of highly reflective mirrors, the method comprising the steps of:
 (a) Providing a stable, initial optical ring-down cavity;
 (b) Delivering a continuous-wave (cw), square-wave-modulated laser beam emitted from a semiconductor laser into said initial optical ring-down cavity;
 (c) Detecting the temporal signal of the intensity of said laser beam exiting said ring-down cavity immediately after switching off the output beam of said semiconductor laser at the negative step of the square-wave modulation signal and then determining the initial-cavity decay time;
 (d) Inserting a test planar mirror into said initial ring-down cavity to construct a testing ring-down cavity, repeating the steps (b) and (c) to determine the testing-cavity decay time;
 (e) Calculating the reflectivity of said test planar mirror with said initial- and testing- cavity decay time.

17. The method of claim 16, wherein said initial optical ring-down cavity comprises two plano-concave mirrors and a planar mirror.

18. The method of claim 17, wherein said planar mirror and first plano-concave mirror construct a short arm and said planar mirror and second plano-concave mirror construct a long arm, and said test planar mirror is inserted between the planar mirror and the second plano-concave mirror, that is, in the long arm of the initial ring-down cavity.

19. The method of claim 16, wherein said cw modulated laser beam is coupled into said initial ring-down cavity by obliquely transmitting through said planar mirror.

20. The method of claim 16, wherein said cw modulated laser beam is perpendicular incident to the two plano-concave mirrors.

21. The method of claim 16, wherein part of said cw modulated laser beam is retro-reflected by the first plano-concave mirror back into the oscillator cavity of said semiconductor laser after retro-transmitted through said planar mirror.

22. The method of claim 16, wherein said test planar mirror is a highly reflective planar mirror.

23. The method of claim 16, wherein the angle of incidence of said cw modulated laser beam to said test planar mirror is between about 1° and 85°.

24. The method of claim 16, wherein the reflectivity of said test planar mirror is calculated by both initial-cavity decay time and testing-cavity decay time.

25. The apparatus of claim 16, wherein the drive current/voltage of said semiconductor laser is modulated by a square-wave signal with a frequency less than the reciprocal of ten times of said initial cavity decay time.

* * * * *